Figure 1:
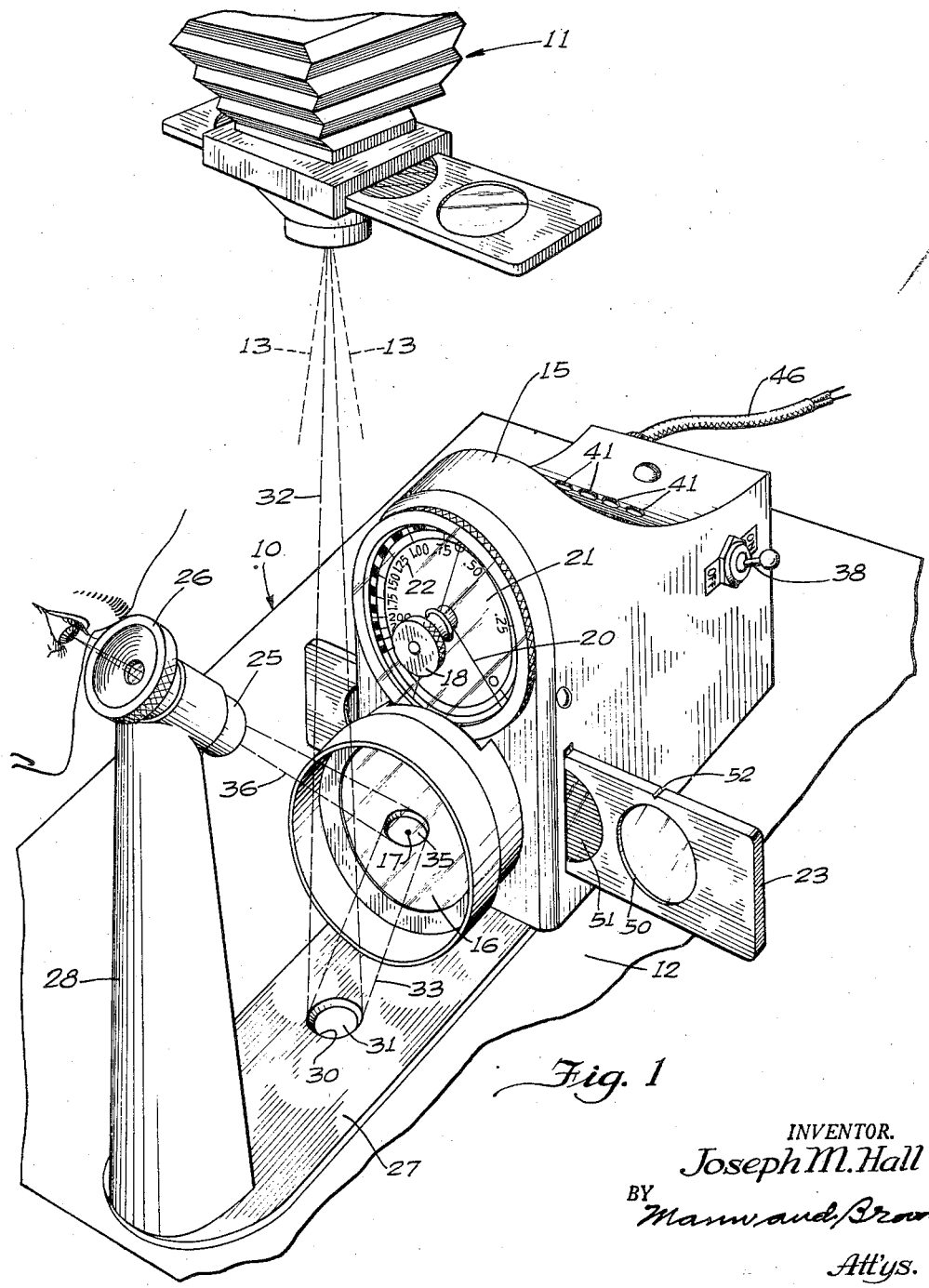

April 27, 1948.  J. M. HALL  2,440,266
COMPARISON TYPE LIGHT MEASURING DEVICE
Filed Dec. 4, 1944  2 Sheets-Sheet 2

INVENTOR.
Joseph M. Hall
BY Mann and Brown
Attys.

Patented Apr. 27, 1948

2,440,266

UNITED STATES PATENT OFFICE 2,440,266

COMPARISON TYPE LIGHT MEASURING DEVICE

Joseph M. Hall, Chicago, Ill.

Application December 4, 1944, Serial No. 566,431

12 Claims. (Cl. 88—23)

The present invention relates to means for measuring light, and, while the principles involved may be incorporated in various instrumentalities, the invention is being initially embodied in a densitometer for use in photography. A description of such an embodiment will provide adequate guidance for those skilled in the art who may have occasion to apply the invention to other specific purposes.

The general object of the present embodiment of the invention is to provide a measuring device that is sufficiently accurate and sensitive and covers a sufficient range of light values to serve as a reliable precision instrument for various dark room procedures. More particularly, my object is to provide a highly convenient device for such purposes as ascertaining the characteristics of photographic emulsions, ascertaining exposure factors for photographic printing without the necessity of resorting to the usual test exposures for each print, ascertaining the density ranges of transparencies and making accurately balanced separation negatives and positives in color photography.

One of the common disadvantages of light meters for use with enlargers is the necessity of intercepting the light to be measured on a plane spaced substantially above the easel or projection plane on which the actual printing is to be made.

In using a conventional device of the character described the casing of the instrument receives the projected light beam for measurement and must be of substantial thickness to enclose at least a portion of the means for receiving and measuring the light. As a result, the image actually viewed on the instrument surface is not only of higher intensity than the image to be printed on the easel surface below but is also out of focus. Frequently the image on the higher instrument surface is so much out of focus as to make it difficult for the operator to identify a particular portion of the image for measurement that may be clearly seen in the sharply focused image on the lower printing plane.

One of the important objects of my invention is to provide such a device that avoids entirely the necessity of interposing any functional means between the enlarger and the printing surface. As a consequence, any portion of the instrument provided to receive the projected image for measurement may be relatively thin, for example a plate or panel to rest on the printing surface, the plate being so thin as to lie within the field of focus of the projected light beam. In my preferred practice of the invention, however, it is my object to eliminate entirely the necessity for providing a projection surface on the device itself, an important feature of the invention being the measuring of light values directly from the easel or printing surface.

A further object of the invention is to provide a light meter of the character described that is simple and sturdy in construction but nevertheless highly accurate and highly flexible in the sense of lending itself to the solution of various problems of exposure and development in color photography as well as in black and white photography.

In general, my objects are attained by employing a mirror to reflect light from the projection surface to the observer's or the operator's eye, the mirror having a translucent spot within its reflecting area and adjustable means being provided to illuminate the spot for matching with the light from the surrounding reflecting surface.

The above and other objects and advantages of my invention will be apparent from the following detailed description taken with the accompanying drawings.

Figure 2:
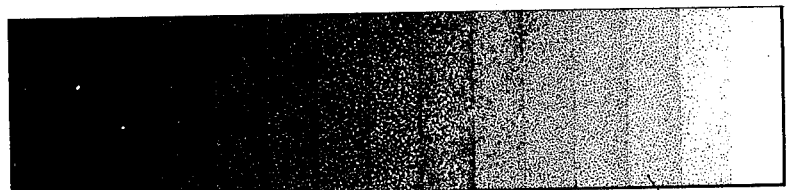
Figure 3:
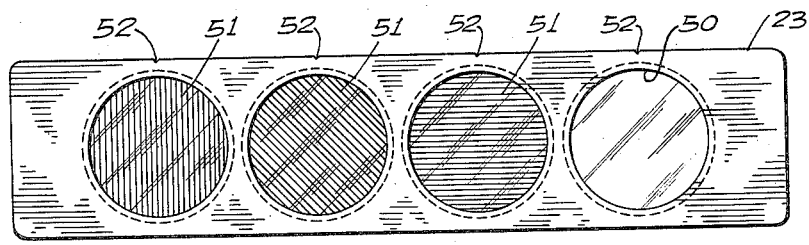
Figure 4:
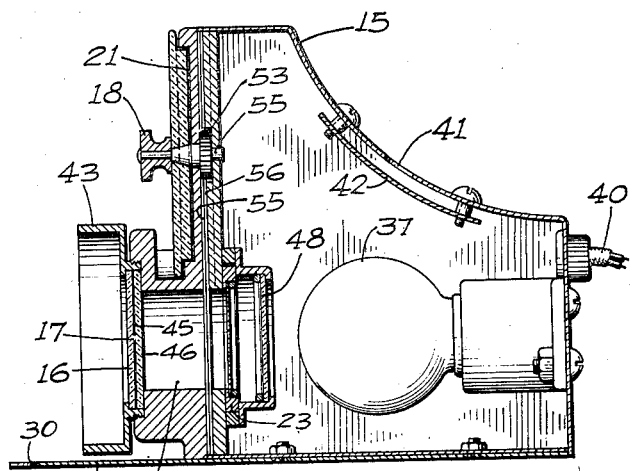
Figure 5:
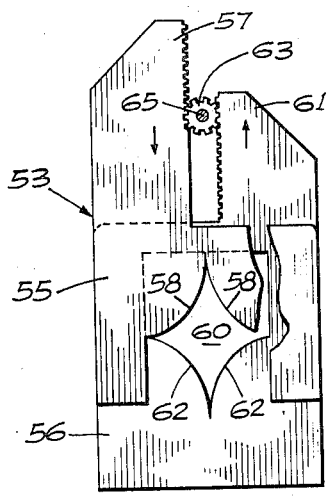

In the drawings, which are to be considered as merely illustrative,

Figure 1 is a perspective view showing a preferred embodiment of my invention in use under an enlarger, Figure 2 is a face view of a gray scale comprising one element in a combination for use with an enlarger, Figure 3 is a face view of a filter panel that may be employed in color processes, Figure 4 is a longitudinal vertical section through the device shown in Figure 1, and Figure 5 is a front elevation of a variable orifice means employed in the device, parts being broken away.

Figure 1 shows by way of example a preferred embodiment of my invention positioned on an enlarging easel 10 for use in conjunction with images projected by an enlarger 11 onto the projection surface 12 of the easel. The total bundle of projected light, the outline of which is indicated by the dotted lines 13, comprises numerous light beams varying in intensity in accord with the pattern of the image to be projected.

The principal parts of the device shown in Figure 1 include: a densitometer casing 15; an outwardly facing mirror 16 that is built into the casing 15 as a wall portion thereof and has a small light-transmitting spot 17 within its reflecting area; means adjustable by a knurled knob 18 for illuminating the spot 17 from the interior of the casing; and means to indicate the effect of the interior illumination in terms of light value or density, such means comprising a pointer 20 operatively connected to the knob 18 and a dial 21 under the pointer carrying a suitable scale 22. For procedures in color photography, a color filter means 23 may be added.

In a simple practice of the invention, only the above generally described structure is requisite. Preferably, however, an eyepiece or magnifier 25 having a knurled focusing adjustment 26 is provided for convenience and accuracy. To hold the magnifier 25 in alignment with the mirror 16 in the region of the spot 17, I may provide an apron or base 27 uniting the casing 15 with a standard 28 on which the magnifier is mounted. The base 27 may be simply a relatively thin metal plate to serve as a projection surface for the light to be measured, but, in the preferred practice of my invention, the base 27 is of open construction to permit the light under measurement to be projected directly onto the surface 12 of the easel 10. Thus, in the particular construction shown in Figure 1, the base 27 is a plate having an opening 30 so that when the device rests on the projection surface 12, the opening 30 will unmask a portion 31 of the projection surface 12 to receive the light under measurement.

The beam 32 comprising the portion of the light from the enlarger that is projected through the opening 30 onto the surface portion 31 is reflected from the surface portion 31 along the path 33 to the small elliptical area 35 around the spot 17 on the mirror 16 and in turn is reflected by the mirror 16 along the path 36 to the magnifier 25.

It will be noted that in the described arrangement, the mirror 16 and the magnifier 25 are on opposite sides of the beam of light 32. Usually such a beam of light 32 comprises a pattern of several smaller light beams of different intensities, the device being shifted as necessary to cause the particular smaller beam selected for measurement to be viewed in the mirror 16 adjacent to the light spot 17.

The casing 15 serves as a light box containing a lamp 37 that is controlled by a switch 38 and is energized by means of a light cord 40 from the same circuit as the enlarger 11. For ventilation, the casing 15 may have a series of vent openings 41 in its upper wall with a suitable plate 42 spaced inwardly from the vent openings to prevent light leakage without interfering with flow of air.

The mirror 16 is preferably mounted in a hood or circular shade 43 having the function of cutting off extraneous side light. Either the inner or the outer surface of the mirror 16 may be silvered for light reflection. In the particular construction indicated in Figure 4, the inner surface of the mirror is covered with a coating of silver 45, there being a small clear area to form the light-transmitting spot 17 on the mirror. Such a spot may be on the order of 1/32 inch in diameter.

To make the spot 17 luminous when viewed at the angle indicated in Figure 1, it is necessary to employ some means for diffusing the light from the interior of the casing, and, for such purpose, I may employ any suitable medium such as opal glass or ground glass. Figure 4 shows a disc of opal glass 46 contiguous to the silver coating 45. Light from the lamp 37 passes through a passage 47 of substantial diameter and preferably a second diffusion disc 48 is placed at the inner end of this passage, the two diffusion discs insuring uniform illumination of the spot 17.

The previously mentioned color filter means 23, as best shown in Figure 3, may comprise a panel having a circular aperture 50 that is open and having three additional similar apertures containing the three different color filters 51 required in color processes. Each of the circular apertures is of substantially the same diameter as the light passage 47 and may be positioned selectively in registration with the light passage. For convenience, the filter means 23 may have suitable registration notches 52 for engagement by a suitable yielding registration latch means in the casing 15 (not shown). As indicated in Figure 4, the color filter means 23 is preferably positioned across the light passage 47 near the inner diffusion disc 48.

Any suitable means may be employed for varying the intensity of the light that reaches the light-transmitting spot 17 from the lamp 37. Rather than vary the energization of the lamp 37 for this purpose, I prefer to employ a variable orifice means or variable light mask in the path of the light from the lamp. A suitable adjustable orifice means for example may comprise relatively movable plates having orifice-defining edges conforming to logarithmic curves so that the area of the orifice will vary in geometrical progression in response to simple relative movement of the plates.

As best shown in Figure 5, the variable orifice means, generally designated 53, comprises a forward plate 55 and a rearward plate 56 in overlapping relation. The forward plate 55 has a rack portion 57 and two re-entrant edges 58 conforming in configuration to logarithmic curves and deposited to form the upper half of a variable orifice 60. In like manner, the rearward plate 56 has an upper rack portion 61 and two curved edges 62 positioned to form the lower half of the orifice 60. The two rack portions 57 and 61 of the two plates 55 and 56, respectively, are engaged by a pinion 63 on a stub shaft 65 that carries the adjustment knob 18 whereby clockwise rotation of the knob will increase the area of the orifice 60 and counterclockwise rotation will decrease the area of the orifice.

The previously mentioned scale 22 on the dial 21 is preferably the well-know logarithmic scale of density values and the previously mentioned pointer 20 is mounted on the stub shaft 65 to traverse the scale, the scale and the cooperating pointer being calibrated with the illumination-varying effect of the variable orifice means 53. In many procedures involving the use of such a light-measuring instrument, it is desirable to compare two successive readings. As a convenience to this end, the described device may include a second manually adjustable pointer for use with the scale 22. In the present construction for example a transparent disc 66 of plastic or glass is rotatably mounted on the stub shaft 65 to serve as a face cover for the dial 21 in spaced relation thereto. The transparent disc 66 has an exposed knurled periphery 67 for manual adjustment and has a hairline 68 to serve as the reference pointer.

The manner in which the invention operates for its purpose may be readily understood from the foregoing description. To ascertain the density of a selected portion of a transparency in the enlarger 11, the operator measures the intensity of the corresponding portion of the image projected onto the surface 12. To make such a measurement, the device is shifted over the surface to place the opening 30 at the desired part of the image and then the knob 18 is rotated as required to cause the illumination of the spot 17 to balance the illumination of the surrounding reflecting area of the mirror 16, balance being achieved when the illuminated spot apparently disappears by merger into the surrounding area. to ascertain the density range of a transparency, it is merely necesary to compare the readings taken at the lightest and darkest portions of the projected image. When the first of the two readings is taken, the pointer or hairline 68 is registered with the position of the pointer 20 and remains in this position for comparison with the subsequent position of the pointer 20 indicating the other of the two extreme light readings.

The device is of special utility as a precision means for arriving at correct enlarging exposures both in black and white photography and in colored photography with minimum expenditure of materals for test purposes. It is not necessary in such practices to make a test strip for each print from a given lot of sensitive sheet material once the light-sensitive characteristics of the lot have been ascertained by means of the instrument.

The utility of the device in enlarging may be apperciated from the following description of a suggested procedure for obtaining black and white prints.

In the suggested procedure, the operator has on hand lots of different grades of printing paper and makes of record the density range or scale and the speed or sensitivity of each lot. To ascertain such data, it is quite helpful to employ what is known as a photographic step table, i. e., a gray scale transparency having graduations such as indicated in Figure 2.

The gray scale is placed in the negative holder of the enlarger 11 for the purpose of projecting a graduated image of the gray scale on a piece of white paper providing the projection surface 12. The operator decides upon a period of exposure, say ten seconds, and then stops down the enlarger to an adjustment which he believes will cause the range of light values represented by the projected graduated image to bracket the density range covered by light-sensitive material to be tested. The enlarger is then turned off. A piece of light-sensitive material under test is then placed on the easel 10 and the enlarger is turned on again for ten seconds' printing time. The exposed test strip is then developed and fixed in the usual manner to ascertain at what points on the test strip the darkest and lightest areas fall. If the light values of the projected image bracket the extreme values of the paper, one of the graduated steps of the projected image will produce dead black on the test strip and a few steps away will appear dead white.

Suppose, for example the step 70 of the gray scale transparency in Figure 2 causes the corresponding step on the image to print black and the step 71 causes the corresponding portion of the test strip to print white, the intervening areas of the test strip being graduated steps from one extreme to the other. By again projecting the gray scale and measuring the light values at the two areas corresponding to steps 70 and 71, the operator ascertains both the range or scale of the printing paper and the sensitivity of the printing paper. In the case of a #2 paper for example, the image of the step 70 may give a density reading of 220 and the image of the step 71 may give a density reading of 110, the scale of the paper being 110. Either of these two values may be taken as the speed of the paper according to whether the operator decides to measure from the dark end or the light end of the scale. If the dark end is chosen, the operator will not the speed of the printing paper as 220.

In practice, the above procedure may be shortened by employing standardized settings of the intensity of the light from the enlarger at which the light values of the various steps of the image are all known from previous measurements. Thus, by placing the densitometer on the image of one of the steps with the pointer 20 at a given value on the scale 22 and adjusting the enlarger light to balance the illuminated spot 17 on the densitometer, all of the steps of the projected image may fall on known values including for example the value 220 for the step 70 and the value 110 for the step 71. Such a procedure eliminates the necessity for taking light measurements at steps 70 and 71 after the test strip is developed.

In a particular brand of printing paper widely used, the density range values of different lots will be approximately as follows:

1 paper—printing range 120
2 paper—printing range 110
3 paper—printing range 100
4 paper—printing range 90, the various lots varying somewhat in speed or sensitivity.

With the above information of record, suppose the operator desires to make a print from a negative in the enlarger. The first step is to ascertain the density range of the negative by using the densitometer to measure the intensities at the darkest and light areas of the projected images. The readings may be for example 230 and 140, revealing a density range of 90. To make a correct print with ten seconds' exposure, the operator places the densitometer at the darkest spot of the image, sets the pointer 20 at the value on the scale 22 corresponding to the speed of the lot of #4 paper and adjusts the enlarger light to balance out the luminous spot 17 on the densitometer. The enlarger is turned off, a sheet of #4 paper is placed on the easel, the enlarger is turned on for a period of ten seconds and the exposed paper is developed and fixed in the usual manner to produce a correct print.

It will be readily apparent to those skilled in the art without further explanation how the device may be employed in precision procedures for color photography. By ascertaining the light-sensitive characteristics of the various emulsions, taking the required density readings and developing to different gammas derived from the readings accurately balanced, wash-off reliefs for the different colors may be achieved with confidence and with economy in both time and materials.

This application is a continuation-in-part of my co-pending application, Serial No. 499,551, filed August 21, 1943, entitled "Color photography," and now abandoned.

Various changes and substitutions within the scope of my appended claims will occur to those skilled in the art.

I claim:

1. In a densitometer for measuring a light beam projected onto a substantially horizontal surface, a casing adapted to rest upon said surface on the side of said beam opposite from the observer without masking the projection of the beam on said surface, a mirror serving as a wall of said casing in a direction transversely of the axis of the beam, said mirror facing outwardly of the casing and being positioned to direct to the observer's eye by reflection an image of the beam projection on said surface, said mirror having a light-transmitting spot within its reflecting area, a light source within said casing to illuminate said spot, a plurality of relatively movable members in a plane intersecting the path of light from said source to said spot, said plurality of members cooperating to define an aperture for controlling the illumination of said spot whereby the illumination of the spot may be matched with the light reflected from the mirror surface around the spot, said aperture having at least one edge conforming to a logarithmic curve so that relative movement of said members in arithmetical progression will vary the area of said aperture in geometrical progression, and means to indicate the relative positions of said members in terms of light value.

2. In a densitometer for evaluating a light beam projected downward from an enlarger upon a substantially horizontal surface, a base adapted to rest on said surface in a position extending in opposite directions from said beam, said base being of open construction to leave unmasked the projection of the beam on said surface, a casing mounted on said base at a position to lie to one side of said beam, a mirror serving as a wall of said casing with its reflecting face directed toward said beam from one side of the beam, said mirror being positioned to direct upwardly by reflection an image of said projection on a line of sight toward the opposite side of the beam, a viewing lens, and means mounted on said base to hold said viewing lens on said line of sight on said opposite side of the beam.

3. In a densitometer for evaluating a light beam projected downward from an enlarger upon a substantially horizontal surface, a casing adapted to rest upon said surface on the side of said beam opposite from the observer without masking at least a portion of the projection of the beam on said surface, an upright mirror serving as a wall of said casing, the reflecting surface of said mirror facing outwardly of the casing for positioning to one side of said beam to direct to the observer's eye by reflection an image of at least a part of said unmasked portion of the beam projection, said mirror having a light-transmitting spot surrounded by its reflecting area, variable means within said casing to illuminate said spot to known light intensities for matching with said image, a viewing lens for the observer, and means connected with said casing in a manner to extend therefrom to the observer's side of the beam without intersecting the beam for holding said viewing lens on the observer's line of sight.

4. In a densitometer for evaluating a light beam projected downward from an enlarger upon a substantially horizontal surface, a casing adapted to rest upon said surface on the side of said beam opposite from the observer without masking at least a portion of the projection of the beam on said surface, an upright mirror serving as a wall of said casing, the reflecting surface of said mirror being directed outwardly of the casing for positioning to one side of said beam to direct to the observer's eye by reflection an image of at least a part of said unmasked portion of the beam projection, said mirror having a light-transmitting spot surrounded by its reflecting area, and variable means within said casing to illuminate said spot to known light intensities for matching with said image.

5. In a device for measuring the light cast downward by an enlarger toward a substantially horizontal surface, a casing adapted to rest upon said surface on the side of said beam opposite from the observer, an outwardly facing mirror serving as an upright wall of said casing, said mirror being positioned to direct to the observer's eye by reflection the image produced by said light, said mirror having a light-transmitting spot on its reflecting area, variable means within said casing to illuminate said spot to known light intensities for matching with said image, a viewing lens spaced from said casing, and means fixedly connecting said lens with said casing for holding said viewing lens on the observer's line of sight.

6. In a device for measuring the light cast downward by an enlarger toward a substantially horizontal surface, a casing to rest movably upon said surface with a portion of the surface unmasked, an outwardly facing mirror serving as an upright wall of said casing, said mirror being positioned to direct to the observer's eye an image of said surface portion by reflection, said mirror having a light-transmitting spot in its reflecting area, and variable means within said casing to illuminate said spot to known light intensities for matching with said image.

7. In a device for measuring the light cast downward by an enlarger toward a substantially horizontal surface, a casing to rest movably upon said surface, an outwardly facing mirror serving as an upright wall of said casing, said mirror being positioned to direct to the observer's eye by reflection the image produced by said light, said mirror having a light-transmitting spot on its reflecting area, and variable means within said casing to illuminate said spot to known light intensities for matching with said image.

8. In a device for measuring the light cast downward by an enlarger toward a substantially horizontal surface, a casing adapted to rest upon said surface on the side of said beam opposite from the observer without masking at least a portion of the projection of the beam on said surface, an outwardly facing mirror serving as an upright wall of said casing, said mirror being positioned to direct to the observer's eye by reflection an image of said surface on which the casing rests, said mirror having a light-transmitting spot on its reflecting area, variable means within said casing to illuminate said spot to known light intensities for matching with said image, and means for positioning selected light filters in said casing to vary the color of the illumination of said spot.

9. In a densitometer for evaluating a light beam projected downward from an enlarger upon a substantially horizontal surface, a casing adapted to rest upon said surface on the side of said beam opposite from the observer, plate means extending from said casing along said surface with an opening therein to permit the projection of the beam on said surface within the area defined by said opening, an upright mirror serving as a wall of said casing, the reflecting surface of said mirror being directed outwardly of said casing and being positioned to direct to the observer's eye by reflection an image of said opening and the area of said surface within the opening, said mirror having a light-transmitting spot, and means to variably illuminate said spot within the casing to known light intensities for matching with said image.

10. In a densitometer for evaluating a light beam projected downward from an enlarger upon a substantially horizontal surface, a casing adapted to rest upon said surface on the side of said beam opposite from the obesrver, an upright mirror carried by said casing, a base plate united with said casing and extending therefrom along said surface with an opening therein to permit the projection of the beam onto an area of said surface defined by said opening, an eyepiece, means for mounting said eyepiece on said base plate on the opposite side of said opening from said casing with the eyepiece inclined downwardly toward the casing, the reflecting surface of said mirror being directed outwardly and being positioned to direct to the observer's eye through said eyepiece by reflection an image of said opening and the area of said surface within the opening, said mirror having a light-transmitting spot surrounded by its reflecting area, and means to variably illuminate said spot within the casing to known light intensities for matching with said image.

11. In a densitometer for evaluating a light beam projected toward a surface, a casing for positioning against said surface, a plate unitary with said casing to extend therefrom along said surface toward the axis of said light beam, a mirror on said casing having a light-transmitting spot, said mirror being positioned to face transversely of the axis of the light beam to direct to the observer's eye by reflection the image produced by the light beam when said casing is in measuring position, and means to variably illuminate said spot from within the casing to known light intensities for matching with said image.

12. A densitometer for use movably on and in contact with a member to evaluate a light beam projected onto the member from the top side thereof, said densitometer having a base for resting on the member and a mirror mounted thereon at an angle to the base adjacent to the beam and facing in a direction transversely of the light beam to reflect at least a portion of the image projected by the light beam, said mirror having a light-transmitting spot, means to variable illuminate said spot from behind the mirror to known light intensities for matching with said image, and a shade extending at an angle from the front of said mirror at its periphery between the mirror and the source of the light beam to shield the mirror from the light beam.

JOSEPH M. HALL.

REFERENCES CITED

The following references are of record in the file of this patent:

UNITED STATES PATENTS

| Number | Name | Date |
| --- | --- | --- |
| 2,172,634 | Axtell | Sept. 12, 1939 |
| 2,190,553 | Tarr | Feb. 13, 1940 |
| 2,324,581 | Haynes | July 20, 1943 |
| 2,333,759 | Akelaitis | Nov. 9, 1943 |

FOREIGN PATENTS

| Number | Country | Date |
| --- | --- | --- |
| 499,052 | Great Britain | Jan. 18, 1939 |
| 803,438 | France | July 6, 1936 |